(12) United States Patent
Kashiwagi

(10) Patent No.: US 7,850,196 B2
(45) Date of Patent: Dec. 14, 2010

(54) OCCUPANT LEG RESTRAINING DEVICE AND RETAINER

(75) Inventor: Daisuke Kashiwagi, Tokyo (JP)

(73) Assignee: Takata Corporation, Tokyo (JP)

( * ) Notice: Subject to any disclaimer, the term of this patent is extended or adjusted under 35 U.S.C. 154(b) by 84 days.

(21) Appl. No.: 11/988,369

(22) PCT Filed: Oct. 30, 2006

(86) PCT No.: PCT/JP2006/321667

§ 371 (c)(1),
(2), (4) Date: Feb. 19, 2008

(87) PCT Pub. No.: WO2007/052611

PCT Pub. Date: May 10, 2007

(65) Prior Publication Data

US 2008/0252048 A1 Oct. 16, 2008

(30) Foreign Application Priority Data

Nov. 2, 2005 (JP) ............................. 2005-320051

(51) Int. Cl.
*B60R 21/20* (2006.01)
*B60R 21/205* (2006.01)
(52) U.S. Cl. ................. 280/728.2; 280/728.1; 280/732; 280/743.1
(58) Field of Classification Search ............... 280/728.1, 280/728.2, 732, 743.1
See application file for complete search history.

(56) References Cited

U.S. PATENT DOCUMENTS

| 6,715,789 | B2 * | 4/2004 | Takimoto et al. | 280/730.1 |
| 2003/0094795 | A1 * | 5/2003 | Takimoto et al. | 280/730.1 |
| 2004/0160042 | A1 * | 8/2004 | Takimoto et al. | 280/730.1 |
| 2004/0164527 | A1 * | 8/2004 | Nagata et al. | 280/730.1 |
| 2005/0116446 | A1 * | 6/2005 | Mabuchi et al. | 280/728.2 |
| 2006/0279073 | A1 * | 12/2006 | Hotta et al. | 280/730.1 |
| 2007/0096439 | A1 * | 5/2007 | Kashiwagi | 280/728.2 |
| 2007/0182134 | A1 * | 8/2007 | Mizuno et al. | 280/730.1 |
| 2008/0238048 | A1 * | 10/2008 | Ishida | 280/728.2 |

FOREIGN PATENT DOCUMENTS

| EP | 1 314 617 | 5/2003 |
| JP | H08-282416 | 10/1996 |
| JP | H09-118191 | 5/1997 |
| JP | H10-001011 | 1/1998 |
| JP | 2002-067852 | 3/2002 |
| JP | 2004-025929 | 1/2004 |
| JP | 2005/206068 | 8/2005 |

* cited by examiner

*Primary Examiner*—Paul N. Dickson
*Assistant Examiner*—Barry Gooden, Jr.
(74) *Attorney, Agent, or Firm*—Manabu Kanesaka

(57) ABSTRACT

An occupant leg restraining device includes a knee airbag that expands in front of legs of an occupant in a vehicle, a gas generator that inflates the knee airbag by ejecting gas, and a retainer that accommodates and holds the gas generator and the folded knee airbag. The retainer has outlets adjacent to both ends of the gas generator in a longitudinal direction of the gas generator that is accommodated in the retainer.

9 Claims, 5 Drawing Sheets

OCCUPANT LEG RESTRAINING DEVICE AND RETAINER

TECHNICAL FIELD

The present invention relates to occupant leg restraining devices and retainers for the occupant leg restraining devices including airbags for preventing the lower legs of occupants from striking against interior panels and the like in front of seats and for regulating the movement of the lower bodies of the occupants toward the front of vehicles by restraining peripheral portions of the knees of the occupants in the event of collisions of automobiles and the like.

BACKGROUND ART

Some occupant leg restraining devices for preventing the lower legs of occupants from striking against interior panels in front of seats in the event of frontal collisions of fast moving bodies such as automobiles include an airbag disposed inside an interior panel (in a space behind the interior panel), a gas generator for inflating the airbag, a retainer that accommodates and holds the airbag and the gas generator at normal times (while a fast moving body such as an automobile is not involved in a collision), and a lid that is disposed over a rear opening of the retainer so as to cover the airbag.

In such an occupant leg restraining device, the airbag is usually folded and accommodated in the retainer inside the interior panel, and the lid is disposed over the rear opening of the retainer so as to cover the folded airbag during normal times. When an automobile or the like is involved in a frontal collision, the gas generator ejects gas. The gas is supplied to the airbag, and the lid is opened in response to the expansion of the airbag. With this, the airbag can expand toward the exterior of the interior panel, and can be deployed between the interior panel and the lower legs of an occupant, thereby preventing the lower legs of the occupant from striking against the interior panel (hereinafter, an airbag of this type expanding in front of the occupant legs is referred to as a knee airbag).

In a known occupant leg restraining device for a driver, a case (retainer) for a knee airbag is composed of sheet metal, and is disposed below a steering column. The case includes a peripheral wall having a substantially rectangular tube shape, a bottom wall (bottom plate) that closes an opening of the peripheral wall that faces the front side of a vehicle, and a substantially rectangular opening that faces the rear side of the vehicle. In addition, a right wall portion (side wall portion) of the peripheral wall has a through-hole through which an inflator (gas generator) can pass, whereas a left wall portion (side wall portion) of the peripheral wall is closed (see Patent Document 1).

Patent Document 1: Japanese Unexamined Patent Application Publication No. 2005-206068 (Page 4, FIG. 3)

DISCLOSURE OF INVENTION

Problems to be Solved by the Invention

In the above-described technology, a basic structure of an occupant leg restraining device including a retainer that accommodates and holds a knee airbag and a gas generator is disclosed.

In order to optimize the occupant leg restraining device, improvements in flexibility in the layout of the gas generator are required.

Accordingly, it is an object of the present invention to provide an occupant leg restraining device and a retainer capable of improving flexibility in the layout of a gas generator.

Means of Solving the Problems

In order to achieve the above-described object, a first invention includes an airbag that expands in front of legs of an occupant in a vehicle; a gas generator that inflates the airbag by ejecting gas; and a retainer that accommodates the gas generator and the folded airbag. The retainer has openings adjacent to both ends of the gas generator in a longitudinal direction of the gas generator that is accommodated in the retainer.

According to the first invention, the retainer has the openings adjacent to both ends of the gas generator in the longitudinal direction of the gas generator that is accommodated in the retainer. With this, a harness, for example, can be connected to the gas generator via one of the openings formed adjacent to both ends of the gas generator, so that a harness-connecting portion of the gas generator can be located at either end of the gas generator in the longitudinal direction thereof when the gas generator is accommodated in the retainer. Accordingly, flexibility in the layout of the gas generator during accommodating in the retainer can be improved. As a result, flexibility of the routing path of the harness can also be improved. For example, the harness can be drawn from one of the openings closer to a control device that controls ignition of the gas generator, and can be connected to the control device via the shortest path. Furthermore, flexibility in the layout of electrical instruments such as the control device of the gas generator in a vehicle cabin can also be improved.

A second invention, which is dependent on the first invention, is characterized in that the openings correspond to outlets for drawing a harness connected to the gas generator.

A third invention, which is dependent on the first or second invention, is characterized in that the retainer has ribs adjacent to the openings formed adjacent to both ends of the gas generator. With this, the retainer, whose strength can be reduced by the openings, can be reinforced in the vicinity of the openings, and the deformation of the retainer during the expansion of the airbag can be regulated.

In order to achieve the above-described object, a fourth invention, in which a retainer accommodates an airbag and a gas generator that inflates the airbag by generating gas, includes openings formed adjacent to both ends of the gas generator in a longitudinal direction of the gas generator that is accommodated in the retainer.

With this, a harness can be drawn from one of the openings when the retainer according to the fourth invention is used in an occupant leg restraining device for a driver, and a harness can be drawn from the other opening when the retainer is used in an occupant leg restraining device for a passenger. Thus, the common retainer can be used for a vehicle in which the harness for a driver and the harness for a passenger are symmetrically laid out for a driver and a passenger without preparing separate dies for individually producing the retainer for the left side of the vehicle and the retainer for the right side of the vehicle. As a result, the retainer can be applied to vehicles of more types, resulting in improvements in the versatility of the retainer and a reduction in production costs.

Advantages

According to the present invention, flexibility in the layout of the gas generator can be improved.

BEST MODE FOR CARRYING OUT THE INVENTION

Figure 1:
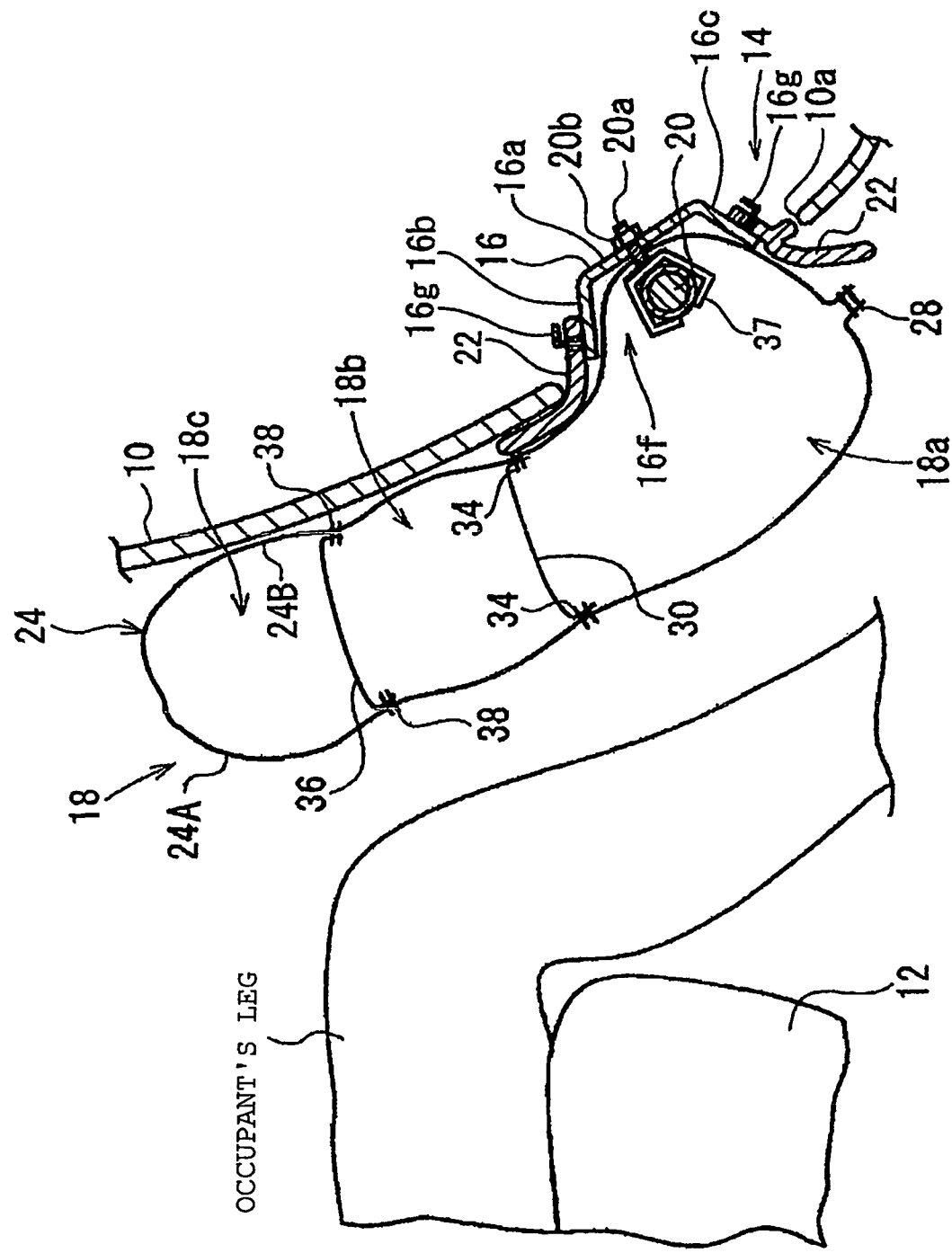
FIG. 1 is a cross-sectional view schematically illustrating a part in front of a seat in a vehicle while a knee airbag of an occupant leg restraining device according to an embodiment of the present invention is expanded.
Figure 2:
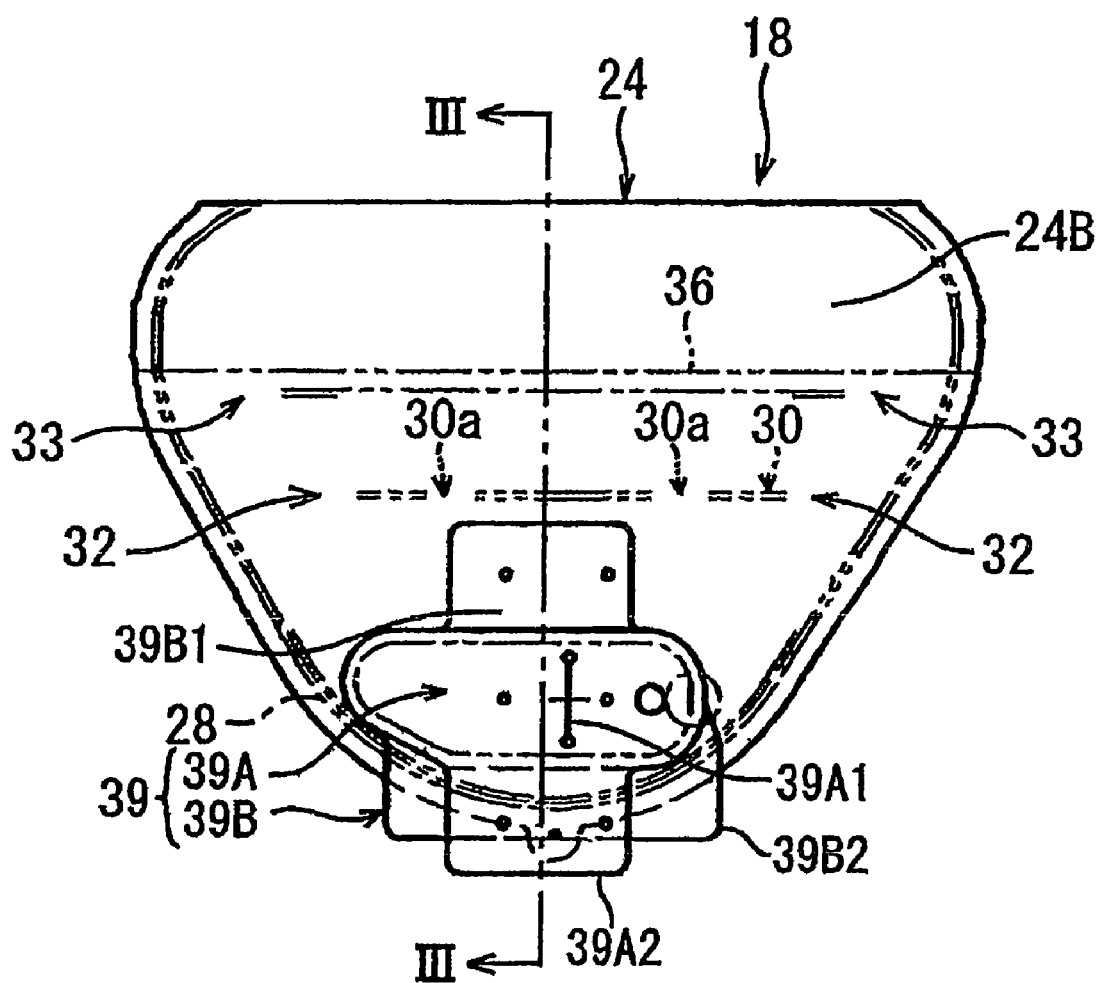
FIG. 2 is a front view plan view of the knee airbag when viewed from a side of an interior panel.
Figure 3:
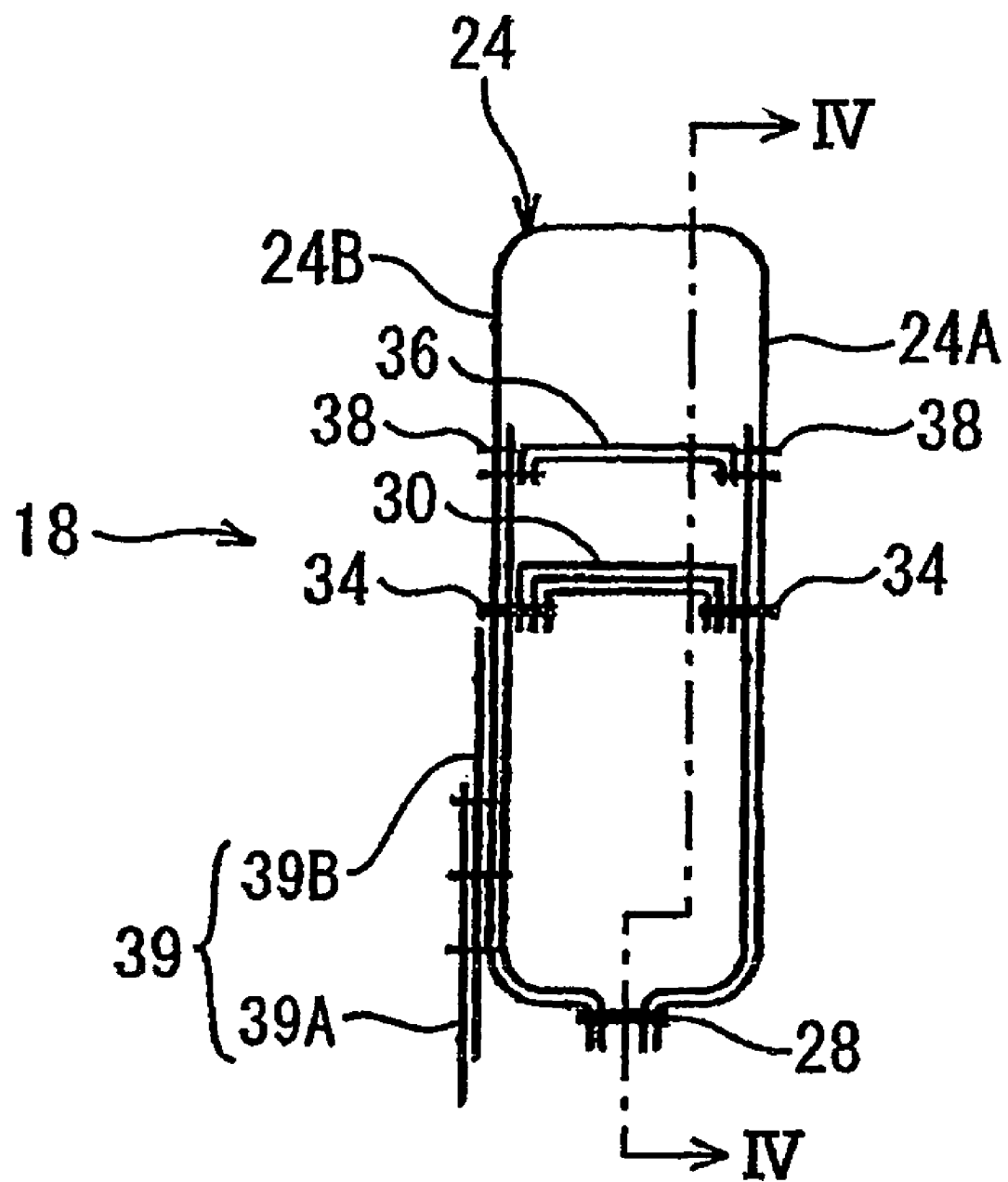
FIG. 3 is a cross-sectional view taken along line III-III in FIG. 2.
Figure 4:
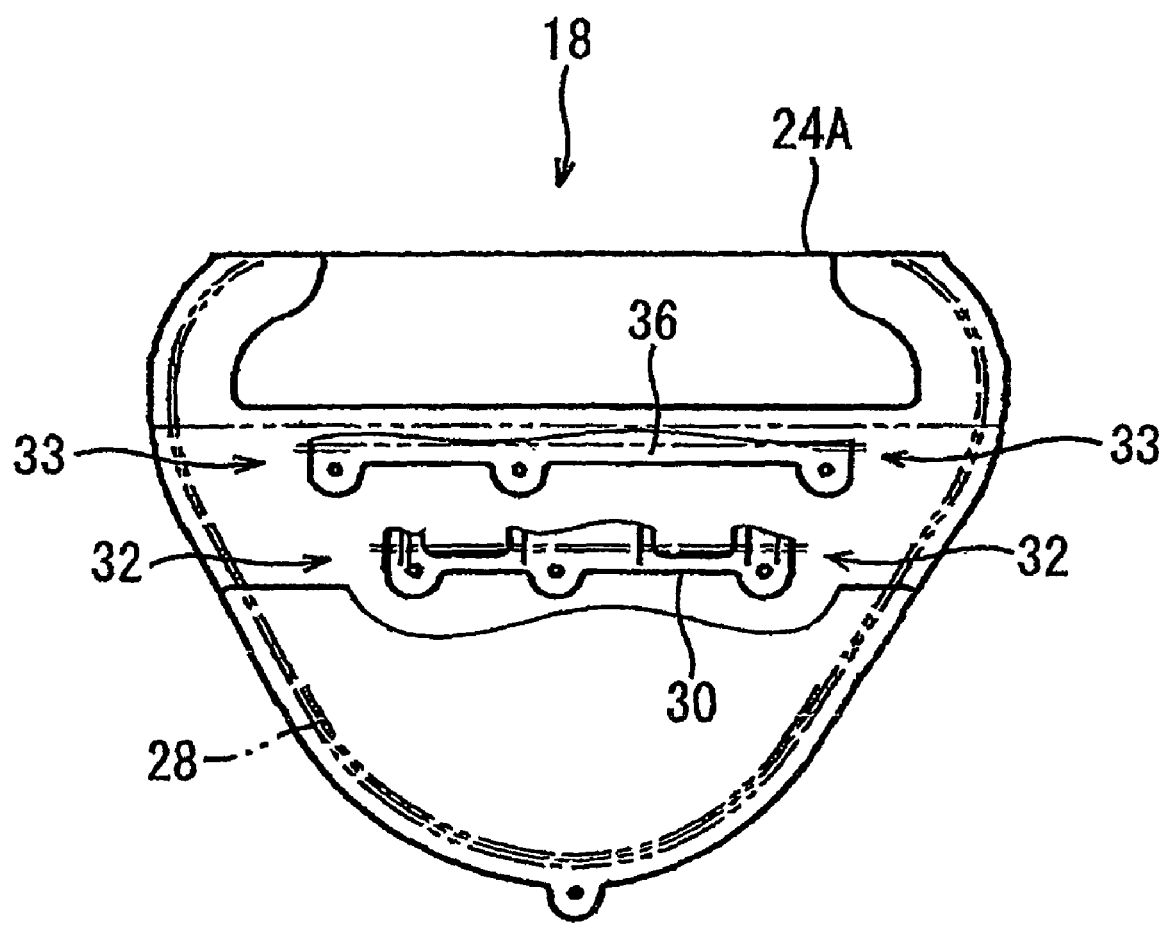
FIG. 4 is a cross-sectional view taken along line IV-IV in FIG. 3.
Figure 5:
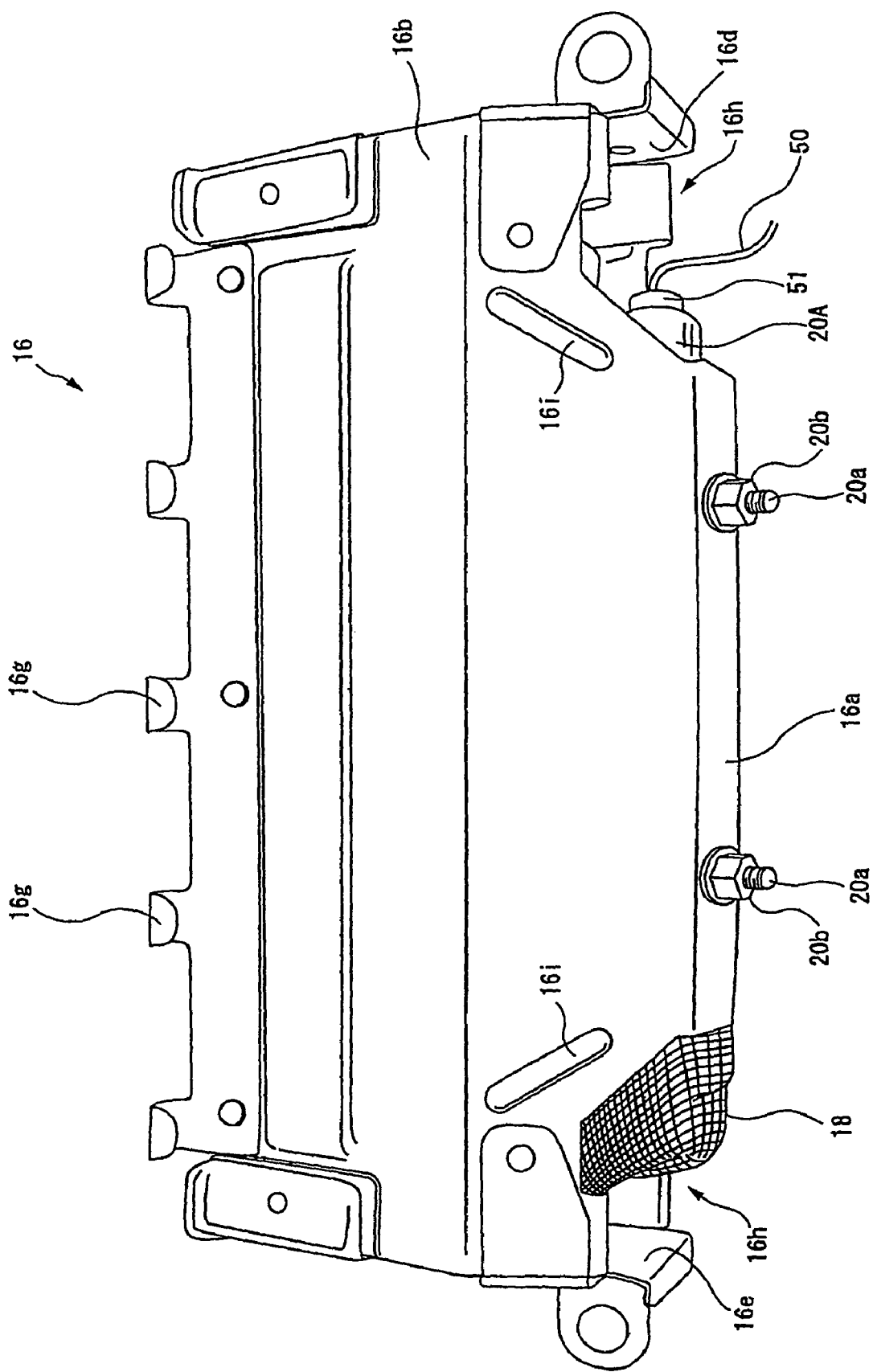
FIG. 5 is a perspective view of the occupant leg restraining device according to the embodiment of the present invention when viewed from above.

An embodiment of the present invention will now be described with reference to the drawings. FIG. 1 is a longitudinal sectional view schematically illustrating a part in front of a seat in a vehicle while a knee airbag of an occupant leg restraining device according to the embodiment of the present invention is expanded. FIG. 2 is a front view (plan view) of the knee airbag when viewed from a side of an interior panel. FIG. 3 is a cross-sectional view taken along line III-III in FIG. 2. FIG. 4 is a cross-sectional view taken along line IV-IV in FIG. 3. FIG. 5 is a perspective view of the occupant leg restraining device when viewed from above. In the description below, a front-rear direction, a front side, and a rear side indicate a longitudinal direction, a front side, and a rear side of the vehicle, respectively. Moreover, a left-right direction, a left side, and a right side indicate a transverse (width) direction, a left side, and a right side of the vehicle, respectively.

As shown in FIG. 1, an occupant leg restraining device 14 is attached to an interior panel 10 serving as a cabin member in front of a seat 12.

The occupant leg restraining device 14 includes a retainer 16 composed of sheet metal having a rectangular-tube shape with a bottom (box shape), a knee airbag 18 serving as an airbag connected to the interior of the retainer 16, and a gas generator 20 for inflating the knee airbag 18. The retainer 16 is disposed at an opening 10a of the interior panel 10.

During normal operation of the vehicle, the knee airbag 18 is folded and accommodated inside the retainer 16, and a lid 22 is disposed over a rear opening of the retainer 16 so as to cover the accommodated knee airbag 18. The lid 22 is disposed substantially inside the interior panel 10 during normal operation of the vehicle, and starts opening outside the interior panel 10 around the upper and lower ends thereof when the knee airbag 18 is inflated.

In this embodiment, the opening 10a is located at a position lower than or equal to the height of the seat surface of the seat 12. When the knee airbag 18 is inflated, the knee airbag 18 expands upward from the opening 10a along the front surface (surface adjacent to the occupant) of the interior panel 10.

The knee airbag 18 is formed of a panel 24, serving as an outer shell, including a front panel portion 24A adjacent to the occupant and a rear panel portion 24B adjacent to the interior panel 10. As shown in FIG. 2, the panel 24 includes the substantially triangular front panel portion 24A and the rear panel portion 24B having substantially the same size connected to each other in this embodiment.

The panel 24 is folded at a connecting portion of the front panel portion 24A and the rear panel portion 24B, and the entire circumferential edges of the front panel portion 24A and the rear panel portion 24B excluding the connecting portion thereof are bound to each other using binding means such as stitching such that the panel 24 has a pouch shape. Reference number 28 denotes a seam of a sewing thread or the like binding the edges of the panel portions. First surfaces of the front panel portion 24A and the rear panel portion 24B are coated with silicon, and face the interior of the pouch-shaped panel.

Two strip-shaped tethers 30 and 36 for regulating the thickness of the bag during the expansion of the bag are disposed inside the knee airbag 18 by sewing. The first tether 30 is located upstream in a direction along which gas ejected from the gas generator 20 flows (lower portion in FIGS. 1 to 4), and both ends of the tether in the width direction thereof are sewn onto the inner surfaces of the knee airbag 18 opposite each other using sewing threads 34. Moreover, the second tether 36 is located downstream in the gas-flowing direction (upper portion in FIGS. 1 to 4), and ends of the tether in the width direction thereof are sewn onto the inner surfaces of the knee airbag 18 opposite each other using sewing threads 38.

As shown in FIGS. 2 and 4, the first tether 30 and the second tether 36 are substantially parallel to the left-right direction of the knee airbag 18 (width direction of the vehicle). As shown in FIG. 1, the interior of the knee airbag 18 is partitioned by the first tether 30 and the second tether 36 such that a first chamber 18a, a second chamber 18b, and a third chamber 18c are formed in this order from the upstream in the gas-flowing direction.

As shown in FIG. 2, flow channels 32 and 33 for allowing the passage of the gas ejected from the gas generator 20 are formed at either end of the first tether 30 and the second tether 36, respectively, in the length direction of the tethers. The flow channels 32 connect the first chamber 18a and the second chamber 18b, and the flow channels 33 connect the second chamber 18b and the third chamber 18c. Moreover, the first tether 30 has at least one flow channel 30a (two in this embodiment) for allowing the passage of the gas ejected from the gas generator 20.

The knee airbag 18 has a gas-generator storage unit 39 at a lower portion thereof. The gas-generator storage unit includes a storage bag 39A for accommodating the gas generator 20 and a protective cloth 39B disposed between the storage bag 39A and the rear panel portion 24B.

The storage bag 39A has a slit 39A1 through which the gas generator 20 is taken in and out and a cover portion 39A2 that covers the slit 39A1 so as to improve the air-tightness of the storage bag 39A. Moreover, the protective cloth 39B has a cover portion 39B1 that covers the slit 39A1 in a manner similar to the cover portion 39A2 of the storage bag 39A, and has a protective portion 39B2 for protecting the knee airbag 18 from the edges of the retainer 16 during the expansion of the knee airbag 18.

When the gas generator 20 is accommodated in the gas-generator storage unit 39 having the above-described structure, the gas generator 20 is first taken in the storage bag 39A through the slit 39A1. Subsequently, the cover portion 39B1 of the protective cloth 39B is folded onto the gas generator 20 so as to cover the slit 39A1, and the cover portion 39A2 of the storage bag 39A is folded onto the gas generator 20 so as to further cover the cover portion 39B1 that covers the slit 39A1. In this manner, the air-tightness of the storage bag 39A (i.e., the knee airbag 18) is improved by doubly covering the slit 39A1 using the cover portions 39B1 and 39A2. In FIG. 1, the gas-generator storage unit 39 is not illustrated.

The substantially cylindrical gas generator 20 and a metallic gas-generator retaining member (diffuser) 37 for retaining the gas generator 20 as shown in FIG. 1 are accommodated inside the gas-generator storage unit 39. The gas generator 20 ejects gas by reacting a gas-generating agent using heat generated by igniting explosives, and is disposed such that the axis of the cylindrical generator corresponds to the width direction of the vehicle.

As shown in FIGS. 1 and 5, stud bolts 20a protrude from a side portion of the gas-generator retaining member 37 that retains the gas generator 20. The stud bolts 20a are fitted into through-holes (not shown) formed in a bottom plate 16a of the retainer 16. The gas generator 20 and the gas-generator retaining member 37 are fixed to the retainer 16 by fixing the stud bolts 20a with nuts 20b.

Moreover, the rear panel portion 24B of the knee airbag 18 is fixed to the retainer 16 while being interposed between the gas-generator retaining member 37 retaining the gas generator 20 and the bottom plate 16a of the retainer 16.

As shown in FIGS. 1 and 5, the retainer 16 is formed of a metal sheet bent by press working so as to have a substantially rectangular-tube shape with a bottom, and includes the bottom plate 16a that faces the front side of the vehicle, an upper plate 16b that faces the upper side of the vehicle, a lower plate 16c that faces the lower side of the vehicle, a left side plate 16d, a right side plate 16e, and a rear opening 16f that faces the rear side of the vehicle, the knee airbag 18 being deployed from the rear opening 16f. A plurality of fitting claws 16g to be engaged with the upper and lower ends of the lid 22 are formed on the rear ends of the upper plate 16b and the lower plate 16c.

Outlets (openings) 16h for drawing a harness for inputting actuating signals connected to the gas generator 20 are each formed at corners adjacent to both ends of the bottom plate 16a of the retainer 16 in the left-right direction (in other words, adjacent to both ends of the gas generator 20 in the longitudinal direction of the gas generator 20). The outlets 16h are formed by cutting off the left and right corners of the upper plate 16b, the bottom plate 16a, and the lower plate 16c.

In addition, slender protrusions 16i serving as ribs are formed on the upper plate 16b adjacent to the outlets 16h by press working. These protrusions 16i extend substantially in cut-off directions of the outlets 16h. The ribs 16i can be formed by welding metal sheets. The ribs 16i reinforce the upper plate 16b adjacent to the outlets 16h.

As shown in FIG. 5, the gas generator 20 is attached to the retainer 16 such that a harness-binding portion 20A of the gas generator 20 is directed to the left side of the vehicle (right side in FIG. 5) in this embodiment, and a connector 51 of a harness 50 is connected to the harness-binding portion 20A of the gas generator 20 via the left outlet 16h.

When the gas generator 20 and the folded knee airbag 18 are accommodated in the retainer 16 as shown in FIG. 5, a gas-ejecting port (orifice; not shown) of the gas generator 20 is not located at the outlets 16h, and is located at a position of the bottom plate 16a between the outlets 16h. Thus, the reactive force during the expansion of the knee airbag 18 can be received by the bottom plate 16a of the retainer 16.

The occupant leg restraining device 14 having the above-described structure actuates the gas generator 20 in response to the actuating signals transmitted via the harness 50 in the event of a vehicle collision so as to generate gas for expanding the knee airbag. The gas is supplied to the first chamber 18a so as to expand the first chamber 18a first. The expansion of the first chamber 18a opens the lid 22 in the manner of double doors.

Subsequently, the gas inside the first chamber 18a flows into the second chamber 18b via the flow channels 30a of the first tether 30 and the flow channels 32 so as to expand the second chamber 18b. Furthermore, the gas inside the second chamber 18b flows into the third chamber 18c via the flow channels 33 so as to expand the third chamber 18c. In this manner, the knee airbag 18 is deployed.

The occupant leg restraining device 14 and the retainer 16 having the above-described structures according to this embodiment can produce the following effects.

That is, in the occupant leg restraining device 14 according to this embodiment, the outlets 16h are formed at both ends of the retainer 16 in the left-right direction. With this, the gas generator 20 can be accommodated in the retainer 16 such that the harness-binding portion 20A of the gas generator 20 is directed to the left side of the vehicle (right side in FIG. 5) and the connector 51 of the harness 50 is connected to the harness-binding portion 20A of the gas generator 20 via the left outlet 16h as shown in FIG. 5. Alternatively, the gas generator 20 can be accommodated in the retainer 16 such that the harness-binding portion 20A is directed to the right side of the vehicle (left side in FIG. 5) and the connector 51 of the harness 50 is connected to the harness-binding portion 20A of the gas generator 20 via the right outlet 16h through which the knee airbag 18 can be seen in FIG. 5 in a manner opposite to that shown in FIG. 5. In this manner, flexibility in the layout of the gas generator 20 when the gas generator 20 is accommodated inside the retainer can be improved.

Moreover, as a result of improvements in flexibility in the layout of the gas generator 20, flexibility of the routing path of the harness 50 can also be improved. For example, the harness 50 can be drawn from one of the outlets 16h closer to a control device that controls ignition of the gas generator 20, and can be connected to the control device via the shortest path. Furthermore, the control device of the gas generator 20 can be disposed at either the left side or the right side of the vehicle in the width direction of the vehicle. Accordingly, flexibility in the layout of electrical instruments such as the control device in the vehicle cabin can also be improved.

Moreover, the retainer 16 according to this embodiment has the outlets 16h for drawing the harness 50 connected to the gas generator 20 at either end thereof in the left-right direction. Therefore, the harness 50 can be drawn from one of the outlets when the retainer 16 is used in an occupant leg restraining device 14 for a driver, and the harness 50 can be drawn from the other outlet when the retainer 16 is used in an occupant leg restraining device 14 for a passenger. Thus, the common retainer 16 can be used for a vehicle in which the harness 50 for a driver and the harness 50 for a passenger are symmetrically laid out for a driver and a passenger without preparing separate dies for individually producing the retainer 16 for the left side of the vehicle and the retainer 16 for the right side of the vehicle. As a result, the retainer 16 can be applied to vehicles of more types, resulting in improvements in the versatility of the retainer and a reduction in production costs. Moreover, since the retainer 16 has the outlets 16h at either end thereof in the left-right direction, the weight of the retainer 16 can be reduced by the weight of the metal sheet corresponding to the area of one outlet 16h as compared with a retainer having only one outlet.

Moreover, since the retainer 16 according to this embodiment has the ribs 16i formed on the upper plate 16b adjacent to the outlets 16h for drawing the harness at either end of the retainer 16 in the left-right direction, the upper plate 16b of the retainer 16, whose strength can be reduced by the outlets 16h, can be reinforced in the vicinity of the outlets, and the deformation during the expansion of the knee airbag 18 can be regulated.

In the descriptions above, the knee airbag 18 having two tethers disposed therein is explained as an example. However, the present invention is not limited to this, and is also applicable to airbags having more tethers or having no tethers. The same effects can be produced also in those cases.

Moreover, in the descriptions above, the present invention is applied to the occupant leg restraining device 14 including the gas generator 20 that ejects hot gas using explosives. However, the present invention is not limited to this, and is applicable to an occupant leg restraining device including a gas generator that ejects high-pressure gas such as argon.

The invention claimed is:

1. An occupant leg restraining device, comprising:
    an airbag that expands in front of a leg region in a vehicle;
    a gas generator that inflates the airbag by ejecting gas; and
    a retainer that accommodates the gas generator and the airbag,
    wherein the retainer has an opening, a bottom plate which is opposite the opening and to which the gas generator is fixed, and side openings formed at sides adjacent to both ends of the bottom plate, both ends of the gas generator in a longitudinal direction being located in the side openings away from side plates of the retainer.

2. The occupant leg restraining device according to claim 1, wherein the side openings correspond to outlets for drawing a harness connected to the gas generator.

3. The occupant leg restraining device according to claim 1, wherein the retainer has ribs adjacent the side openings formed adjacent to the both ends of the gas generator.

4. The occupant leg restraining device according to claim 1, wherein said side openings face obliquely with respect to the bottom plate.

5. The occupant leg restraining device according to claim 4, wherein the retainer further includes end plates which interconnect the side plates, and wherein the opening is defined by the end plates and the side plates.

6. The occupant leg restraining device according to claim 5, wherein one of the end plates has ribs adjacent to the side openings, the ribs extending along the side openings to reinforce the one of the end plates.

7. A retainer for an occupant leg restraining device, the retainer accommodating an airbag and a gas generator that inflates the airbag by generating gas, the retainer comprising:
    an opening, a bottom plate opposite the opening, side plates defining two sides of the opening, end plates which interconnect the side plates, and side openings formed at sides adjacent to both ends of the bottom plate below the side plates, a gas generator being accommodated in the retainer and fixed to the bottom plate such that the both ends of the gas generator are located in the side openings away from the side plates of the retainer.

8. The retainer according to claim 7, wherein said side openings face obliquely with respect to the bottom plate.

9. The retainer according to claim 8, wherein the opening is defined by the end plates and the side plates.

* * * * *